United States Patent [19]

Vida

[11] 3,865,941
[45] Feb. 11, 1975

[54] THERAPEUTIC COMPOSITIONS AND METHOD EMPLOYING 1-MORPHOLINOMETHYL-5-ETHYL-5-PHENYL BARBITURIC ACID OR THE HYDROCHLORIDE SALT THEREOF

[75] Inventor: Julius A. Vida, Boston, Mass.

[73] Assignee: The Kendall Company, Walpole, Mass.

[22] Filed: Jan. 10, 1973

[21] Appl. No.: 322,324

Related U.S. Application Data

[62] Division of Ser. No. 88,194, Nov. 9, 1970, abandoned.

[52] U.S. Cl..... 424/248, 260/247.2 A, 260/256.4 C
[51] Int. Cl............................................. A61k 27/00
[58] Field of Search............424/248; 260/247.2 A, 260/256.4 C

[56] References Cited
OTHER PUBLICATIONS
Rylski et al., Chem. Abst., 68-105144, (1968).

Primary Examiner—Stanley J. Friedman
Attorney, Agent, or Firm—Ellen P. Trevors

[57] ABSTRACT

The hydrochloride salt of 1-morpholinomethyl-5-ethyl-5-phenyl barbituric acid has been provided by the reaction of 5-ethyl-5-phenyl barbituric acid with morpholine, hydrochloric acid and formaldehyde. The use of this compound and 1-morpholinomethyl-5-ethyl-5-phenyl barbituric acid as anticonvulsants, and therapeutic compositions containing the same are also disclosed.

2 Claims, No Drawings

THERAPEUTIC COMPOSITIONS AND METHOD EMPLOYING 1-MORPHOLINOMETHYL-5-ETHYL-5-PHENYL BARBITURIC ACID OR THE HYDROCHLORIDE SALT THEREOF

This is a division of application Ser. No. 88,194 filed Nov. 9, 1970, now abandoned.

This invention relates to the hydrochloride salt of 1-morpholinomethyl-5-ethyl-5-phenyl barbituric acid, to the use of 1-morpholinomethyl-5-ethyl-5-phenyl barbituric acid and its hydrochloride salt as anticonvulsant agents for treating convulsions and seizures in warm-blooded animals and to therapeutic compositions containing these compounds.

Various Mannich bases of 5,5-disubstituted derivatives of barbituric acid have been reported in the literature. Thus, L. Rylski et.al. in Acta Pol. Pharm. 24 (4), 366 70 (1967) disclose the preparation of 1-morpholinomethyl-5-ethyl-5-phenyl barbituric acid from 5-ethyl-5-phenyl barbituric acid, generally referred to as phenobarbital, morpholine and formaldehyde, but do not indicate any specific therapeutic uses for this compound.

Now it has been found that 1-morpholinomethyl-5-ethyl-5-phenyl barbituric acid is an effective anticonvulsant agent for the treatment of convulsions and seizures in warm-blooded animals.

It has also been found in accordance with this invention that the hydrochloride salt of 1-morpholinomethyl-5-ethyl-5-phenyl barbituric acid can be readily prepared and that this hydrochloride salt is also useful as an anticonvulsant agent. While the parent compound can be considered as a highly active anticonvulsant agent, it is a surprising and unexpected feature of this invention that the anticonvulsant efficacy of the hydrochloride salt is much greater than that of 1-morpholinomethyl-5-ethyl-5-phenyl barbituric acid.

The aforementioned hydrochloride salt is readily provided by reacting 5-ethyl-5-phenyl barbituric acid with morpholine, hydrochloric acid and formaldehyde, or aqueous solutions of formaldehyde in a suitable diluent such as ethanol, dimethylformamide, dimethylacetamide, dimethylsulfoxide and the like. The reaction is generally carried out at a temperature between about 25°C to the reflux temperature of the reaction mixture, and the desired hydrochloride salt of 1-morpholinomethyl-5-ethyl-5-phenyl barbituric acid is readily isolated from the reaction mixture by conventional techniques such as filtration, crystallization, etc.

In preparing the therapeutic compositions of this invention, 1-morpholinomethyl-5-ethyl-5-phenyl barbituric acid or its hydrochloride salt may be formulated with conventional physiologically acceptable vehicles and carriers to make syrups, isotonic solutions, tablets and other dosage forms. The effectiveness of the aforementioned compounds is such that each dosage unit may contain from 5 to 500mg. of active material.

The procedures employed for demonstrating efficacy of the compounds as set forth in the following examples were as follows.

All tests were conducted on adult albino male mice (Charles River strain); the dosage consisted of the active agent suspended in 10 percent aqueous acacia and was administered orally.

The time of peak anticonvulsant activity was determined by administering dosages of various sizes to a group of animals and administering a maximal electroshock to the animals at intervals thereafter by supplying 60 ma. current through a corneal electrode for 0.2 second. Protection was indicated if the animal failed to show the tonic extensor component of the maximal electroshock seizure pattern which is uniformly elicited in unprotected animals. The time of peak effect thus determined was used for all subsequent tests of anticonvulsant activity on the same active agent. The anticonvulsant effectiveness was determined against a convulsant dose of Metrazol (106.25 mg/kg) injected subcutaneously; the criterion for effectiveness was failure to show clonic convulsive seizures.

The following examples will serve to illustrate the practice of this invention.

EXAMPLE 1

Following the procedure disclosed by L. Rylski et.al. in Acta Pol. Pharm. 24 (4), 369-73 (1967), 23.0g. of 5-ethyl-5-phenyl barbituric acid was added to a solution of 8.7ml of morpholine and 8.0ml of 37 percent aqueous formaldehyde in 50ml absolute ethanol. After heating at reflux for 30 minutes, the reaction mixture was allowed to cool to room temperature, and then refrigerated overnight. Filtration, followed by washing with ethanol, provided 30g. of 1-morpholinomethyl-5-ethyl-5-phenyl barbituric acid, m.p. 73°C.

Pharmacological testing of this compound revealed anticonvulsant activity against Metrazol, the $ED_{50}$ being about 50 mg/kg, and a time of peak activity of about one hour.

EXAMPLE 2

The amount of 23.0g. of 5-ethyl-5-phenyl barbituric acid was added to a solution of 17.4ml of morpholine, 16.0ml of 37 percent aqueous formaldehyde and 20ml of concentrated hydrochloric acid in 100ml of absolute ethanol. After heating at reflux for 45 minutes, the reaction mixture was allowed to cool to room temperature. Trituration provided a crystalline material which was isolated by filtration, washed with absolute ethanol, and recrystallized from 100ml of absolute ethanol to provide 14g. of the hydrochloride salt of 1-morpholinomethyl-5-ethyl-5-phenyl barbituric acid, m.p. 150°C.

Analysis calculated for $C_{17}H_{22}O_4N_3Cl$:
C, 55.51; H, 6.03; N, 11.42;
O, 17.40; Cl, 9.64
Found:
C, 55.39; H, 6.12; N, 11.59;
O, 17.21; Cl, 9.79

Pharmacological testing of this compound indicated anticonvulsant activity against Metrazol, the $ED_{50}$ being less than 3 mg/kg, and a time of peak activity of about 1 hour.

What is claimed is:

1. A therapeutic composition for treatment of convulsions in warm-blooded animals comprising a physiologically acceptable carrier and an effective amount for treatment of convulsions of 1-morpholinomethyl-5-ethyl-5-phenyl barbituric acid or the hydrochloride salt thereof.

2. A method of treating convulsions in warm-blooded animals which comprises administering to said animals an effective amount for treatment of convulsions of 1-morpholinomethyl-5-ethyl-5-phenyl barbituric acid or the hydrochloride salt thereof.

* * * * *